United States Patent
Oren et al.

(10) Patent No.: US 6,725,045 B2
(45) Date of Patent: Apr. 20, 2004

(54) SYSTEM AND METHOD FOR LOCATING PERSONAL UNITS, NOTIFYING CALLED PARTIES OF INCOMING CALLS AND AUTOMATICALLY ROUTING CALLS TO DESIRED TELEPHONE STATIONS

(75) Inventors: Yariv Oren, Magshimim (IL); Leor Hardy, Givatayim (IL)

(73) Assignee: Virtual Extension Ltd., Givatayim (IL)

( * ) Notice: Subject to any disclaimer, the term of this patent is extended or adjusted under 35 U.S.C. 154(b) by 0 days.

(21) Appl. No.: 09/843,741

(22) Filed: Apr. 30, 2001

(65) Prior Publication Data

US 2002/0004403 A1 Jan. 10, 2002

Related U.S. Application Data

(60) Provisional application No. 60/216,367, filed on Jul. 5, 2000.

(51) Int. Cl.[7] .................................................. H04Q 7/20
(52) U.S. Cl. ........................ 455/445; 455/414; 455/561; 370/210
(58) Field of Search ................................. 455/414, 415, 455/416, 417, 445, 432, 435; 379/201, 211, 212, 210

(56) References Cited

U.S. PATENT DOCUMENTS

| | | | | |
|---|---|---|---|---|
| 4,680,785 A | * | 7/1987 | Akiyama et al. | 340/7.21 |
| 5,375,162 A | * | 12/1994 | Kim et al. | 379/211 |
| 5,481,590 A | * | 1/1996 | Grimes | 379/57 |
| 5,659,596 A | * | 8/1997 | Dunn | 455/456 |
| 5,742,905 A | * | 4/1998 | Pepe et al. | 455/445 |
| 5,809,130 A | * | 9/1998 | Ayala | 379/266.01 |
| 5,903,833 A | * | 5/1999 | Jonsson et al. | 455/445 |
| 5,970,388 A | * | 10/1999 | Will | 455/426 |
| 6,047,184 A | * | 4/2000 | Haces et al. | 455/445 |
| 6,188,888 B1 | * | 2/2001 | Bartle et al. | 455/417 |
| 6,192,231 B1 | * | 2/2001 | Chapman et al. | 455/417 |
| 6,332,085 B1 | * | 12/2001 | Hanson et al. | 455/557 |

* cited by examiner

Primary Examiner—Nay Maung
Assistant Examiner—Tilahun Gesesse
(74) Attorney, Agent, or Firm—Eitan, Pearl, Latzer & Cohen Zedek, LLP

(57) ABSTRACT

The present invention is directed to various methods and systems for locating people and routing telephone calls to telephone stations selected by the called party. According to some embodiments of the present invention, the system may include wireless personal units and a location and routing unit adapted to locate the personal units and to route an incoming call intended for a telephone user associated with a particular personal unit to any one of the telephone stations selected by the telephone user.

10 Claims, 9 Drawing Sheets

SYSTEM AND METHOD FOR LOCATING PERSONAL UNITS, NOTIFYING CALLED PARTIES OF INCOMING CALLS AND AUTOMATICALLY ROUTING CALLS TO DESIRED TELEPHONE STATIONS

CROSS-REFERENCE TO RELATED APPLICATIONS

This application claims priority from U.S. Provisional Patent Application No. 60/216,367, filed Jul. 5, 2000, which is hereby incorporated by reference.

BACKGROUND OF THE INVENTION

Conventional telephone systems identify an actual telephone station based on the telephone number assigned to the extension to which the telephone station is connected. Accordingly, a caller communicates with the intended recipient by calling the desired extension number. When the intended recipient is not physically present in the vicinity of the called extension, the call may be answered by a voice mail, rolled over to another party, or forwarded. In the case of forwarding, this may be to several extensions, ultimately ending in a voice mail, a roll over to an unintended recipient, or simply not answered at all. Regardless of these answering procedures, the caller is not served instantly.

Existing locating systems are based on infrared sensors installed on a dedicated infrastructure that require special installations and cable routing. Other locating systems are based on radio sensors. When such a system locates the intended recipient, the telephone closest to that person automatically rings, However, the system does not allow the intended recipient to have control over the call, e.g. to select the telephone set from which to answer the call, to select not to be disturbed by the call or to deny the call.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
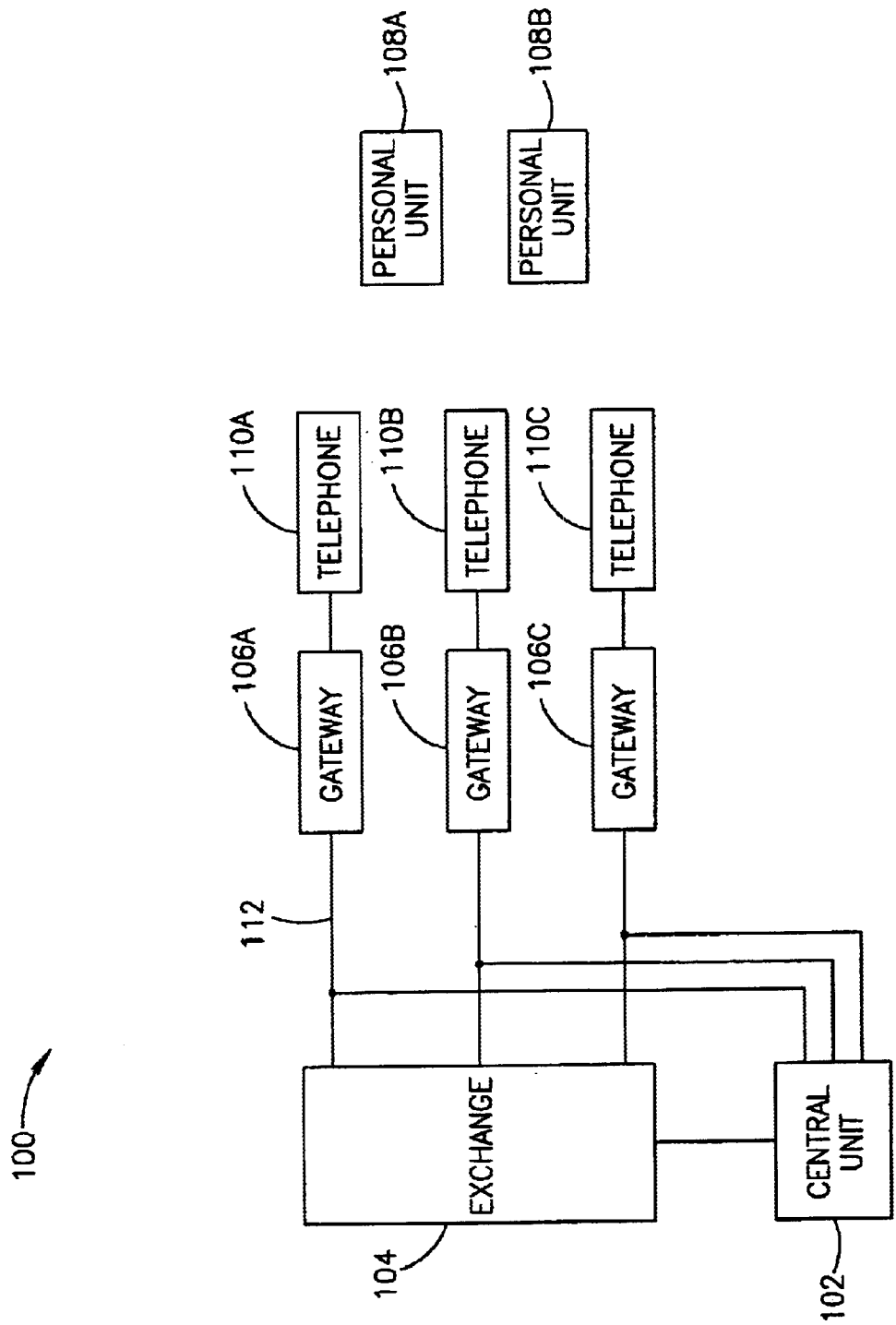
FIG. 1 is a schematic block diagram illustrating a locating and routing system in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements,

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Embodiments of the present invention are directed to a method and system for locating a person carrying a personal unit within a defined facility. Moreover, the system may notify the located person about an incoming call intended for him and may route the call to the telephone set selected by that person in an automatic and seamless process (e.g. transparent to the caller). It may be any telephone extension selected by the recipient, not necessarily the nearest. The system may enable the called party the freedom to select the desired telephone extension while maintaining a silent working environment free of telephone rings.

In some embodiments of the present invention, the call may be routed to the personal unit. In these embodiments, the personal unit may have capabilities of personal-area short-range voice communication, such as a Bluetooth enabled cellular telephone.

Reference is now made to FIG. 1, which is a block diagram of a locating and routing system 100 according to some embodiments of the present invention. System 100 may comprise a central locating and routing unit 102, a plurality of gateways 106 in communication with central unit 102 and a plurality of wireless personal units 108 in communication with gateways 106. Central unit 102 may be coupled to an exchange 104 having a plurality of telephone extensions 110. Non-limiting examples of exchange 104 may include a private branch exchange (PBX), an Internet protocol PBX (iPBX), a cable exchange, a trading floor exchange and a central office.

Gateways 106 may be distributed throughout a defined facility and may be located in the proximity of telephone extensions 110. Moreover, gateways 106 may be cached inside the telephone set or inside the socket of the telephone. Gateways 106 may be adapted to tap on an internal telephone line 112 without creating an off-hook line state as will be explained with respect to FIG. 5.

System 100 may use the existing infrastructure of the telephony system or may use the infrastructure of other communication systems such as a computer network, a cable network a wireless network and the like.

Each personal unit 108 is assigned a unique identification (ID) number and is associated with a person who carries it in the facility or with equipment on which it is mounted. Each personal unit 108 may be adapted to communicate with gateways 106, to alert the person carrying the unit of an incoming call and to enable that person control over the call routing. Personal unit 108 will be described in more detail with respect to FIG. 4.

Figure 2:
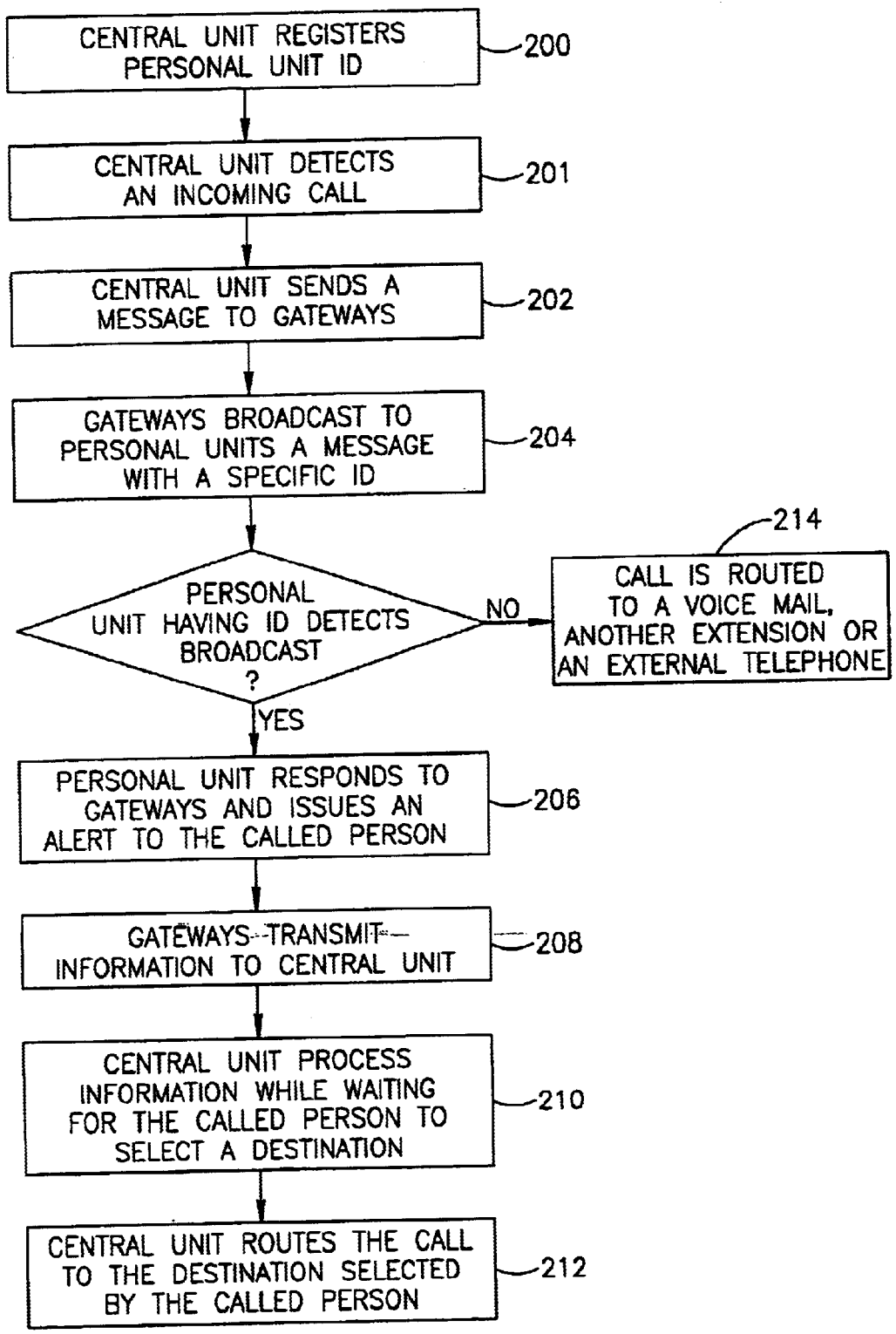
FIG. 2 is a flow chart representing the operation of the system illustrated in FIG. 1.

Reference is additionally made to FIG. 2, which is a flow chart illustrating the operation of system 100 of FIG. 1 according to some embodiments of the present invention. The description given below is an example of a small-scale system coupled to a PBX. However, other embodiments of the system may be implemented on a wider scale, covering service areas such as a university campus, several company campuses connected by a communication system and the like. Non-limiting examples of communication system include point-to-point links, a private network, a virtual private network over a public network, and a public network. A wide-scale locating and routing system will be described with respect to FIG. 7.

Gateways 106 may periodically broadcast a wake up signal which, when received by personal unit 108 may power up their circuits. When a person enters the coverage area of system 100, his personal unit may recognize the wake up signal. In response, personal unit 108 may identify itself to central unit 102 via gateways 106 and central unit 102 may register the personal unit ID (step 200). When exchange 104 receives an incoming call, central unit 102 may intercept the assigned number of the person being called (step 201). A two-way communication channel may then be established between central unit 102 and at least one gateway 106, Other triggers for transmitting messages and queries in order to locate a particular personal unit may also be available. Central unit 102 may send gateways 106 a "Where are you?" message and a request for a broadcast of an inquiry signal including an ID signal of an individual personal unit 108 carried by the person or mounted on an equipment to be located (step 202).

Gateways 106 may process the request and may broadcast the inquiry signal in the form of a radio message "Please respond" over the coverage area in order to locate the requested personal unit (step 204). The broadcast may be received by more than one of personal units 108, however only unit 108A having a matching ID may respond with a confirmation signal. If identified personal unit 108A is within range of any or all gateways 106, it may detect the broadcast of the inquiry signal and may respond with an acknowledgment signal ("I am here" message).

Personal unit 108A may also alert the person carrying the unit, notifying him about an incoming call (step 206). The alert signal of personal unit 108 may take the form of a buzzing signal, a vibration, a light emitting signal or any combination thereof. The use of those alert signals may create a ring-free silent environment, which may be suitable for example in hospitals, libraries and restaurants.

Gateways 106 may receive the acknowledgment signal from personal unit 108A, may evaluate the response, and may transmit the information to central unit 102. This information may include the gateway's own identification and an indication that a positive response was obtained from the desired personal unit (step 208).

Upon receipt of a positive response, central unit 102 may process the information while waiting for the intended recipient to pick up a telephone (step 210). When the intended recipient picks up a certain telephone station according to his preference, central unit 102 may route the call to the selected telephone station (step 212). The recipient may choose to transfer the call to a voice mail or another extension without answering the call.

When the called party is out of the coverage area and his corresponding personal unit does not receive the broadcast, central unit 102 may request exchange 104 to route the call to a voice mail or to another extension. Alternatively, central unit 102 may request exchange 102 to forward the call automatically to an external telephone number, e.g. the mobile telephone number of the called party (step 214).

If personal unit 108 is capable of a personal area short-range voice communication such as a Bluetooth enabled cellular phone, the call may be routed directly to personal unit 108.

System 100 may enable providing a variety of additional location-based value added services and applications. Non-limiting examples of such applications may be location-based advertising, personal location at public place, resource management, security application, tracking a visitor in a classified facility and more.

System 100 may serve as a platform for additional value added services such as e-mail reception alerts, short messages service (SMS) routing, diary updating, and other location-based services. Location-based services may utilize voice over Internet protocol (VoIP) telephony. The implementation of system 100 using a private network may extend the limits of system 100 as will be described with respect to FIG. 7. The implementation of system 100 using a public switched telephone network may also extend the limits of system 100 as will be described with respect to FIG. 8.

Figure 3:
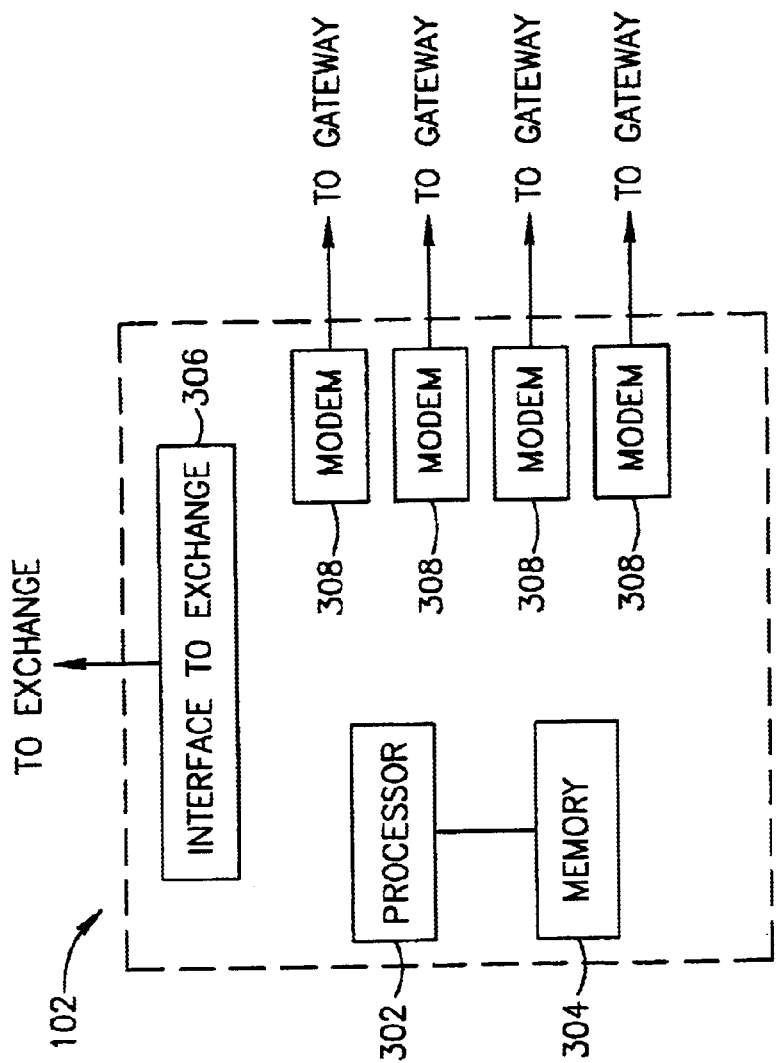
FIG. 3 is a schematic block diagram of the central unit of FIG. 1 constructed in accordance with some embodiments of the present invention.

Reference is now made to FIG. 3, which is a block diagram representing central unit 102 of FIG. 1 according to some embodiments of the present invention, Unit 102 may comprise a processor 302, a memory 304 coupled to processor 302, an exchange interface 306, and a plurality of modems 308, each coupled to a respective one of gateways 106.

Processor 302 may be adapted to control and manage the system's operation. Processor 302 may be further adapted to perform various calculations regarding the location of personal units 108. For example, processor 302 may determine the specific telephone picked up by the intended recipient from all the extensions being at off-hook state. Processor 302 may compare the distances of personal unit 108A of the intended recipient from the extensions at off-hook state and may route the call to that which is closest to personal unit 108A.

Memory 304, which may be a nonvolatile memory such as FLASH memory or a battery backed-up RAM, may store operating parameters. Non-limiting operating parameters stored in the memory may include the ID number, the type of tracking mode, the last time a signal has been received, the type of alert signal, "do not disturb" status and the like.

Non-limiting examples of exchange interface 306 may be a computer telephony interface (CTI), an analog interface such as a foreign exchange office (FXO) interface, a foreign exchange station (FXS) interface and a digital interface such as integrated system digital network (ISDN) primary rate (PRI) interface.

Central unit 102 may have other functions adding more functionality to system 100. Non-limiting examples of such features include: detecting whether a called person is inside the premises, diverting an incoming call to a voice mail upon receiving a command from a personal unit, while possibly notifying the calling party that the called person has been alerted but prefers not to answer at the moment, managing the call diversion process, preprogramming special routing rules and the like.

Figure 4:
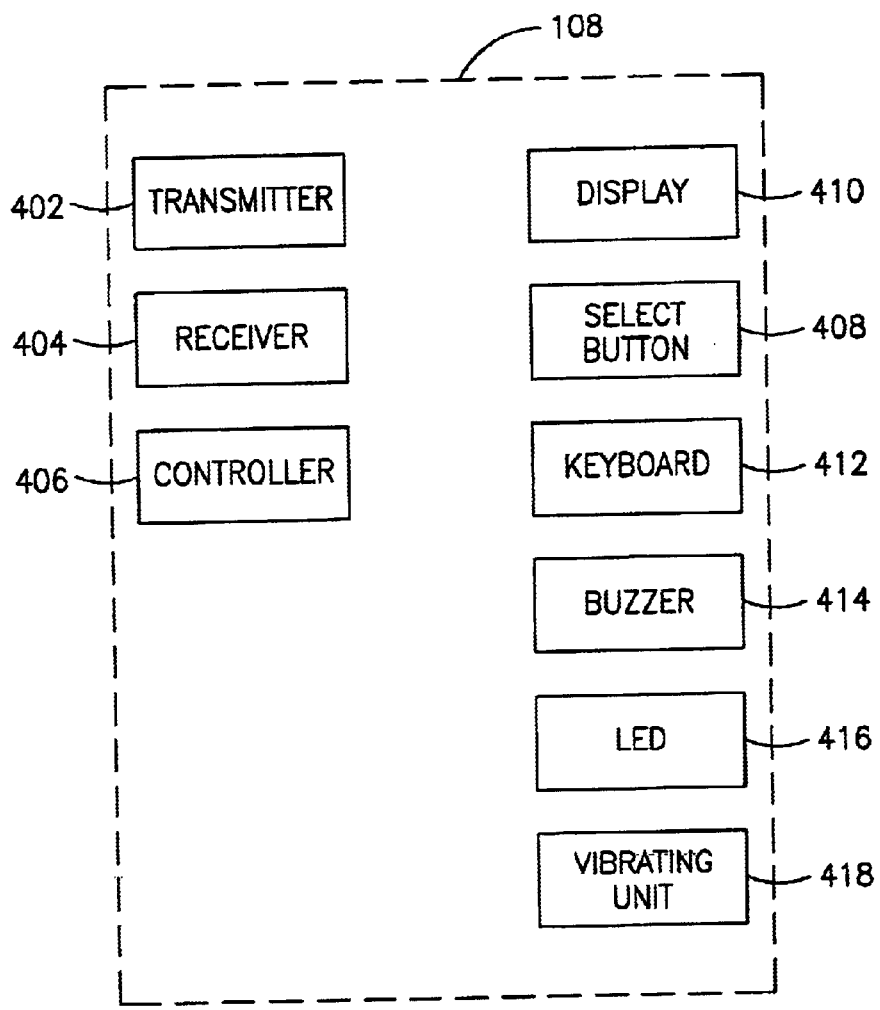
FIG. 4 is a schematic representation of the personal unit of FIG. 1 constructed in accordance with some embodiments of the present invention.

Reference is now made to FIG. 4, which is a block diagram of personal unit 108 of FIG. 1 according to some embodiments of the present invention. Personal unit 108 may comprise a transmitter 402 adapted to transmit signals to gateways 106, a receiver 404 adapted to receive information from gateways 106, a controller 406, select button switches 408 for functions such as mode select and optionally a display 410 and a keyboard 412.

Personal unit 108 may also comprise means for alerting such as a buzzer 414, a light emitting device 416 and a vibrating unit 418.

Controller 406 may be a single integrated circuit chip having a processor and a memory (not shown). The memory may include a database for storing information such as the ID of the personal unit and operational parameters Controller 406 may enable the user a certain amount of control over the incoming call routing. Non-limiting examples of control functions are call diversion to a voice mail or to a preprogrammed extension, call denial (do not disturb function), calling party identification, delay option and the like.

Upon receiving the alert, the called party may choose, by pushing switch 408 or using keyboard 412, to divert the call to a voice-mail or to another extension. The delay option may enable the intended recipient to activate call holding time prolongation, which initiate an announcement for the caller to hold the call.

Figure 5:
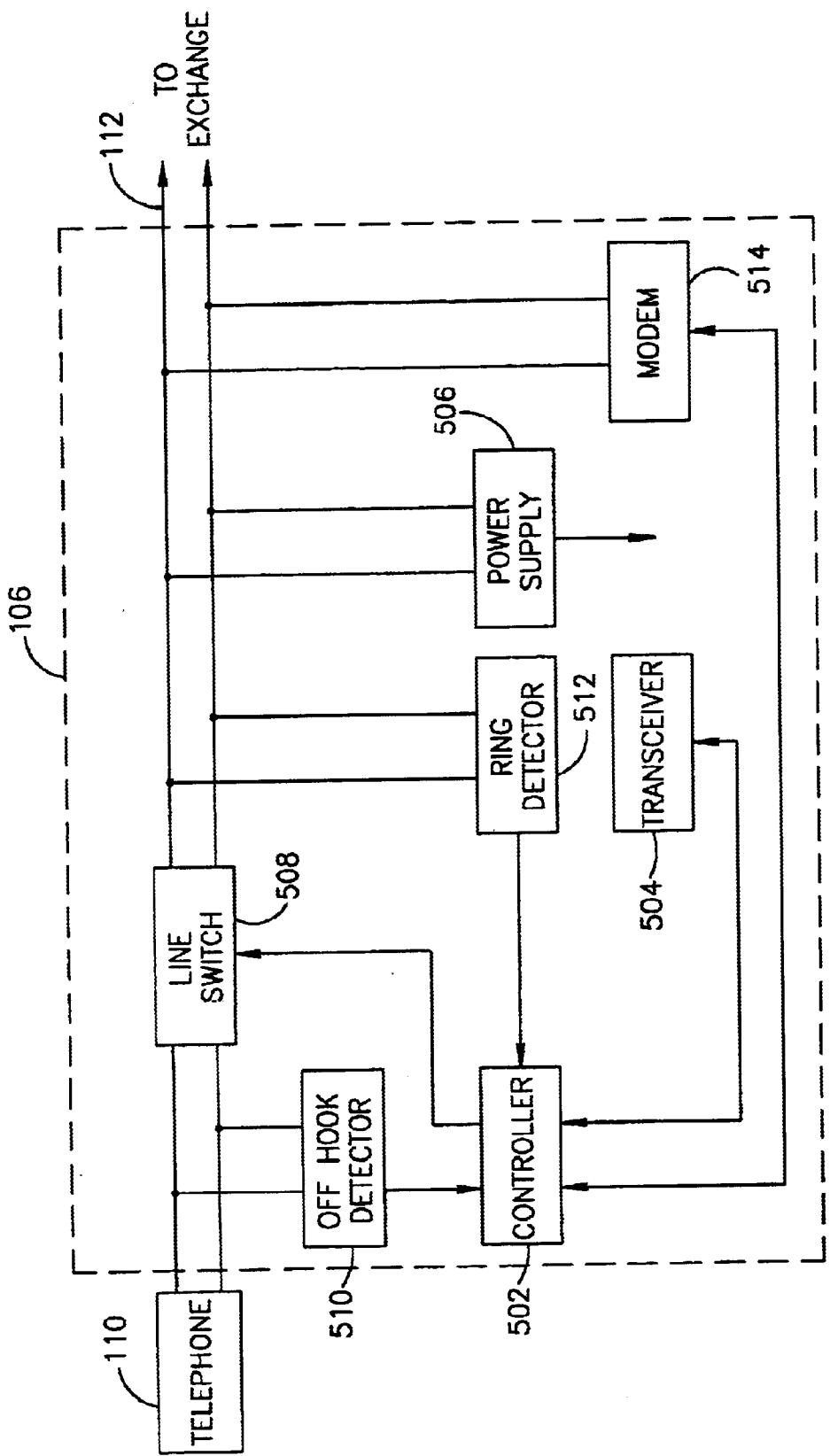
FIG. 5 is a schematic block diagram of the gateway of FIG. 1 constructed in accordance with some embodiments of the present invention.

Reference is now made to FIG. 5, which is a block diagram of gateway 106 of FIG. 1 according to some embodiments of the present invention. Gateway 106 may comprise a controller 502 and an RF transceiver 504 coupled to controller 502. Gateway 106 may further comprise a power supply 506 adapted to draw power from telephone line 112 and a line switch 508 coupled to telephone line 112 and to controller 502. Line switch 508 may be adapted to control the connection of telephone line 112 to exchange 104.

Gateway 106 may further comprise an off hook detector 510, a ring detector 512, and a modem 514, all three coupled to controller 502 and to telephone line 112. Off hook detector 510 may be adapted to detect whether line 112 is in on-hook or off-hook state. Ring detector 512 may be adapted to detect ring signals generated by exchange 104. Modem 514 may be adapted to communicate with modem 308 of central unit 102 of FIG. 1.

Gateway 106 may be adapted to communicate with personal units 108. It may be a two-way RF communication operating in the industrial, scientific, medical (ISM) frequency band, any licensed frequency band or any other wireless communication, such as infrared (IR). Controller 502 may perform various calculations referring to the relative distance of personal units 108 from gateways 106. This calculation is then provided to central unit 102 for further processing.

Figure 6:
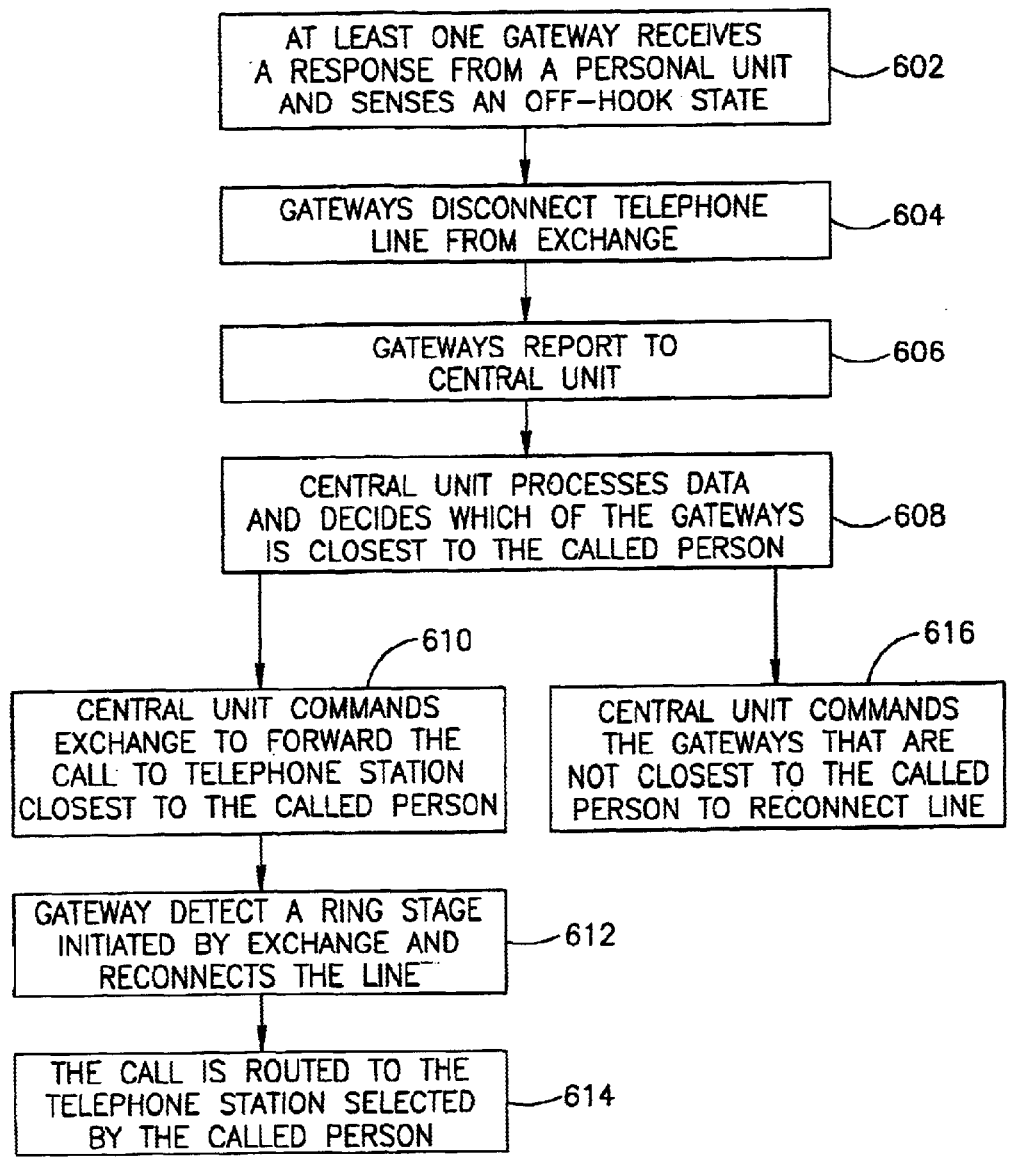
FIG. 6 is a flow chart representing the operation of the system of FIG. 1 after the intended recipient picks up the phone.

Reference is additionally made to FIG. 6, which is a flow chart of the operation of gateway 106 redirecting a call to the extension selected by the called person according to some embodiments of the present invention. When the called person selects one of the telephone stations 110 by picking up its handset, at least one of the gateways 106, which received a response from the personal unit 108 associated with that called person, may detect an off-hook state (step 602).

If at the same time another person picks up another telephone station in the vicinity of the called person and one of the gateways, which received the response from the personal unit associated with the called person detects an off-hook state, central unit 102 may be required to decide which of the extensions creating an off-hook state is the one selected by the called person.

After sensing the off-hook state, gateways 106, which sense an off-hook state may disconnect telephone line 112 from exchange 104 by turning line switch 508 to an open position (step 604). This action may prevent exchange 104 from sensing the off-hook state. Next, gateways 106 may report to central unit 102 via modem 514 about the off hook state (step 606).

Central unit 102 may decide, according to the relative distance data received from gateways 106, which gateway from those that reported an off-hook state is closest to the intended recipient (step 608). Central unit 102 may command exchange 104 to route the call to the telephone station coupled to the gateway closest to the personal unit carried by intended recipient (step 610). Exchange 104 may then initiate a ringing signal. When the ring detector 512 of gateway 106 senses a ring state, controller 502 may be notified and may command line switch 508 to close, thus reconnecting the telephone line 112 to exchange 104 (step 612). The call is then routed to the telephone extension selected by the intended recipient (step 614).

If more than one gateway senses an off-hook state, central unit 102 may also command the gateways that are not the closest to the personal unit associated with the called person, to reconnect the telephone line (step 616).

When personal unit 108 is voice enabled the voice communication may be established between personal unit 108 and gateway 106 via a wireless channel and between gateway 106 and exchange 104 via the existing infrastructure.

Figure 7:
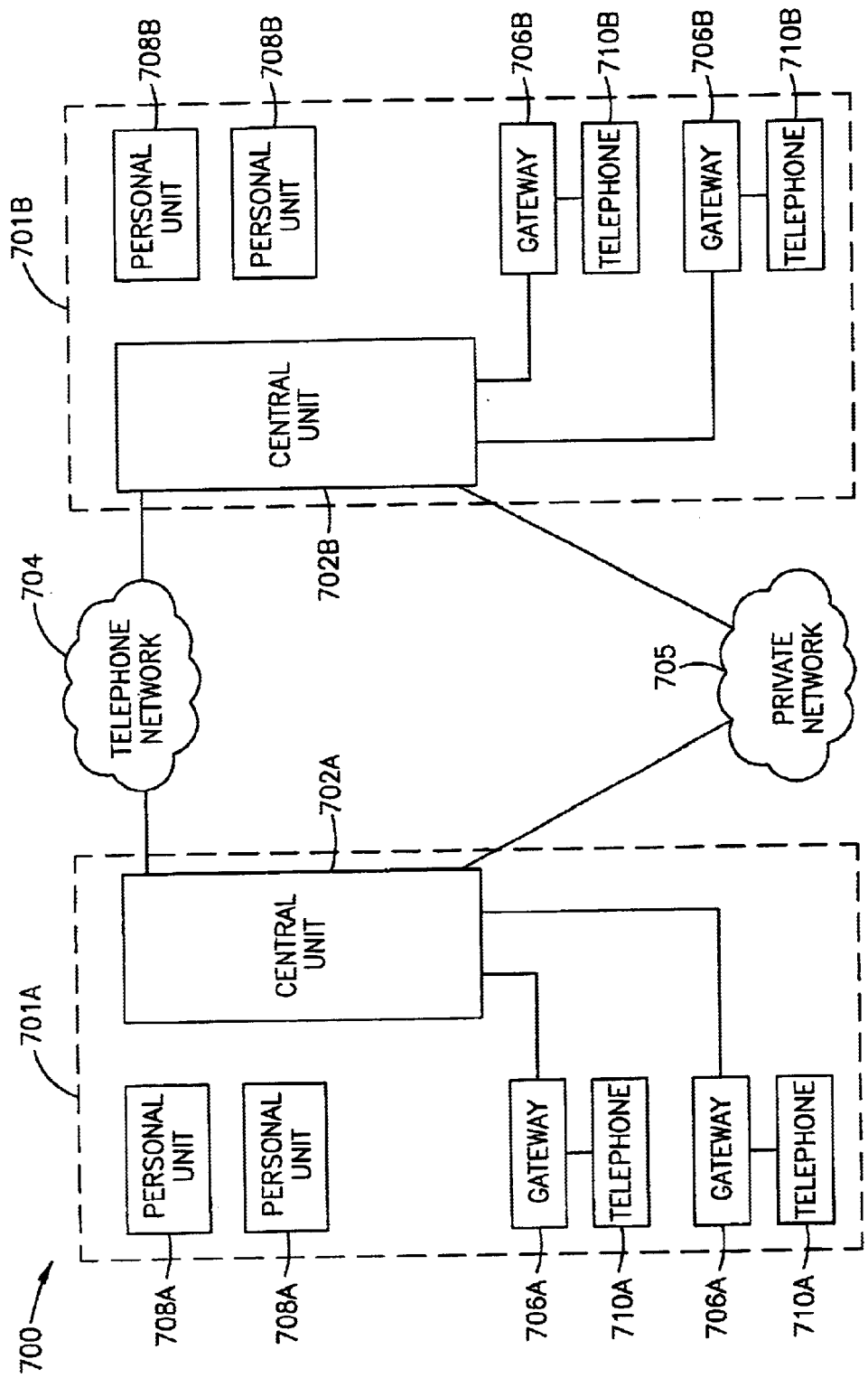
FIG. 7 is a schematic block diagram illustrating a wide-scale locating and routing system in accordance with some embodiments of the present invention.

Reference is now made to FIG. 7, which is a block diagram of a wide-scale locating and routing system 700 according to some embodiments of the present invention. System 700 may comprise at least two local locating and routing systems 701A and 701B coupled via a telephone network 704 and a private network 705. Each system 701 may comprise a central unit 702 adapted to control and manage the system's operation and a plurality of gateways 706 coupled to a plurality of telephone extensions 710 and to central unit 702.

System 701 may further comprise a plurality of wireless personal units 708. Each personal unit 708 is assigned a unique identification (ID) number and is associated with a person who carries it. Each personal unit 708A may be adapted to communicate with gateways 706A coupled to central unit 702A and may also be adapted to communicate with gateways 706B coupled to central unit 702B.

Wide scale implementations may be based on the same principles described above referring to system 100 with some modifications. In system 700, central unit 702 may be coupled to a public telephone network 704. When central unit 702A detects a guest personal unit 708B, central unit 702A may send a broadcast via private network 705 to all the other central units 702 announcing detection of a guest. Home central unit 702B may respond to central unit 702A and then, when an incoming call intended for the user of personal unit 708B arrives, may forward a call intended to roaming personal unit 708B to central unit 702A. It should be noted that the communication between various central units 702 may be accomplished via inter PBX lines of large-scale PBX systems or via an ordinary telephony network.

Figure 8:
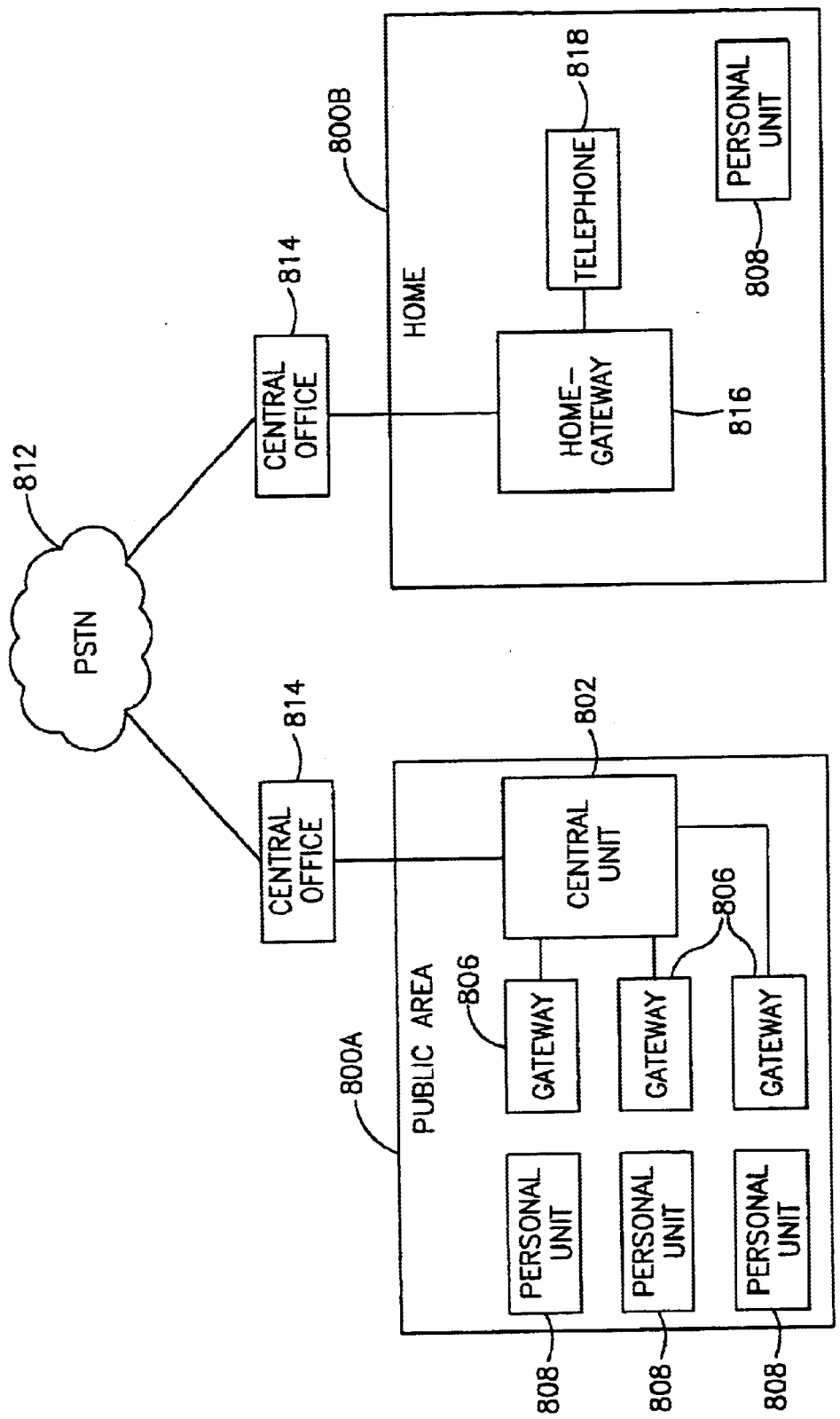
FIG. 8 is a schematic block diagram illustration of a locating and routing system coupled to a PSTN in accordance with some embodiments of the present invention.

Reference is now made to FIG. 8, which is a block diagram of a locating and routing system 800 coupled to a public switched telephone network (PSTN) according to some embodiments of the present invention. For example, system 800A may be located in public places such as shopping malls, stadiums, hotels, parks and the like. In another example, system 800B may be located at home.

System 800A may comprise a central unit 802 coupled to a public switched telephone network (PSTN) 812 via a central office 814. PSTN 812 may be equipped with an intelligent network (IN) having the feature "redirect" and capabilities of managing a central IN database. System 800A may further comprise a plurality of gateways 806 in communication with central unit 802 and a plurality of voice-enabled Bluetooth-enabled personal units 808.

An example of a voice enabled personal unit may be a Bluetooth enabled cellular telephone. Each personal unit 808 may be assigned a "personal number" by the operator of PSTN 812. System 800 may utilize the "personal number" IN feature of PSTN to route calls to personal units 808. When a person carrying personal unit 808 is in the proximity of one of gateways 806, incoming and outgoing calls may be routed via PSTN 812.

System 800B may be located at home and may comprise a home gateway 816 coupled to PSTN 812 via central office 814 and to a telephone 818 and a wireless voice enabled communication device 808. Home gateway 816 may be adapted to communicate with personal unit 808 and with central office 814.

Figure 9:
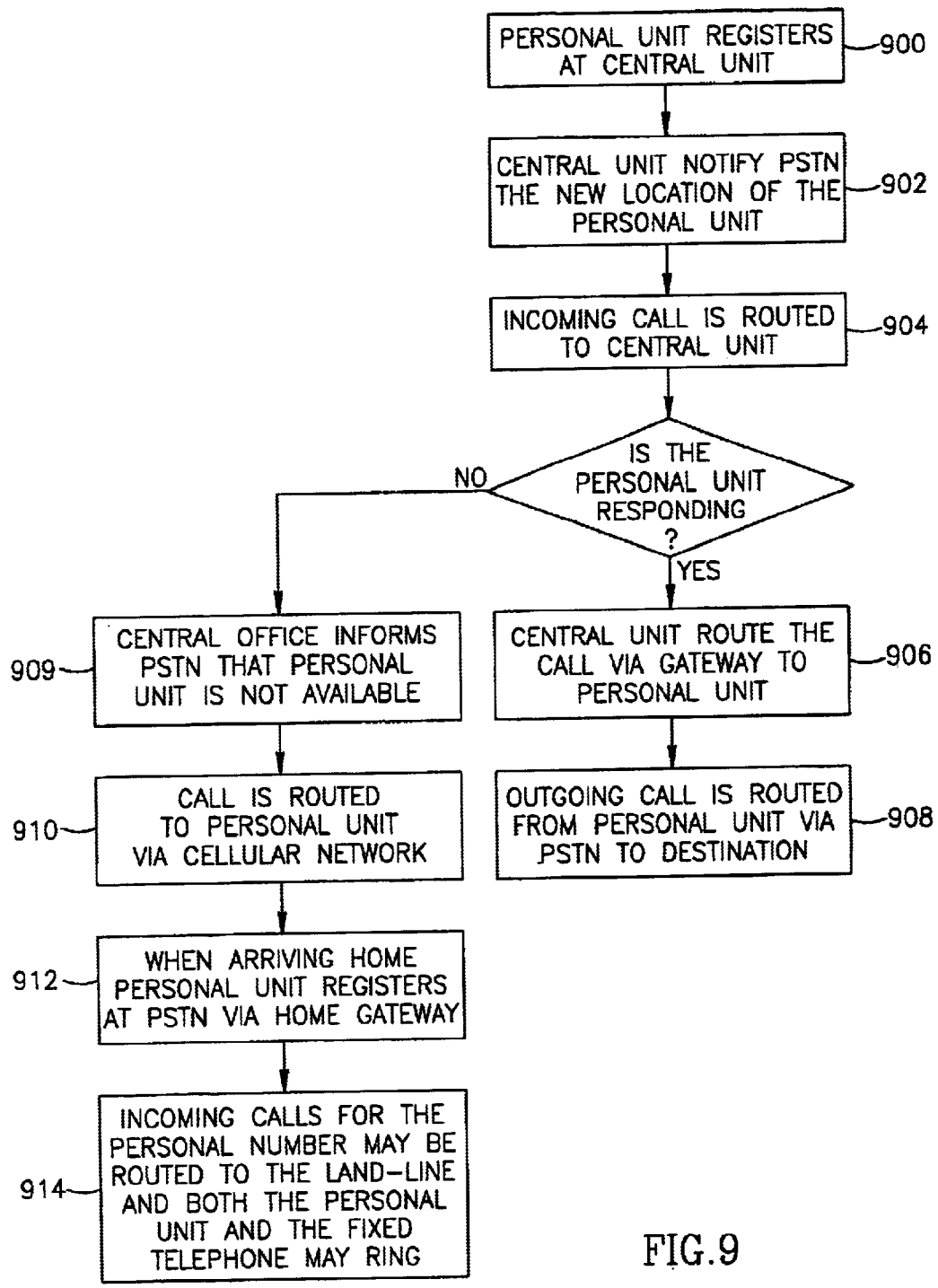
FIG. 9 is a flow chart representing the operation of the system illustrated in FIG. 8.

Reference is additionally made to FIG. 9, which is a flow chart illustrating the operation of the system of FIG. 8 according to some embodiments of the present invention. When a person carrying personal unit 808 enters a predefined public area having system 800A, the personal unit may automatically register itself at central unit 802 (step 900).

Central unit 802 may inform PSTN 812 the new location of personal unit 808 according to its personal number (step 902) Incoming calls may automatically be redirected by PSTN 812 to central unit 802 (step 904). Central unit 802 may locate a suitable gateway 806 and may route the call to personal unit 808 via gateway 806 (step 906). For outgoing calls the person carrying personal unit 808 may dial a telephone number and the call may be routed via gateway 806 to the destination (step 908).

When an incoming call designated to a person who left that public area is routed to central unit 802, central unit 802 may inform PSTN 812 that the personal unit is not available (step 909). The call may then be automatically routed to the cellular operator network (step 910). When the person carrying personal unit 808 enters his home 800B, personal unit 808 may automatically register at PSTN 812 via home gateway 816 (step 912). Incoming calls for the personal number may be routed to the landline and both the personal unit 808 and the fixed telephone 818 may ring (step 914). For outgoing calls, the person may dial from personal unit 808 via gateway 816 using the landline.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What we claim is:

1. A system comprising:
   a plurality of wireless personal units, each associated with a respective telephone user;
   a location and routing unit coupled to a telephone exchange having telephone stations, said location and routing unit to locate a particular one of said personal units and to notify said particular personal unit of an incoming call intended for its respective telephone user and to automatically route said incoming call to a desired telephone station being in proximity to said particular personal unit once said telephone user off-hooks said desired telephone station; and
   a plurality of gateways each coupled to one of said telephone stations, said gateways to communicate with said location and routing unit and with said personal units.

2. The system of claim 1, wherein said personal unit is voice enabled and said location and routing unit able to route said incoming call to said personal unit when said telephone user does not cause any one of said telephone stations to be off-hook or when said telephone user selects said personal unit.

3. The system of claim 1, wherein each gateway comprises:
   an off-hook detector to detect an off-hook line state when its respective telephone station is off-hook; and
   a line switch in communication with said off-hook detector, said line switch to emulate an on-hook line state when said telephone station is off-hook.

4. The system of claim 3, wherein said gateway is able to draw power from said telephone line.

5. The system of claim 1, wherein said locating and routing unit is able to automatically route said incoming call to a mobile telephone of said telephone user when the personal unit associated with said telephone user is not in communication with said locating and routing unit.

6. The system of claim 1, wherein each personal unit has at least one feature selected from the group including: caller identification, call diversion to a voice mail, can diversion to a predefined extension, call forwarding to an external telephone number, call denial and call holding prolongation feature.

7. The system of claim 1, wherein said personal unit is integrated into a mobile telephone.

8. The system of claim 1, wherein said personal unit is integrated into a hand held computing device with or without a wireless communication capability.

9. A system comprising:
   a plurality of personal units, each associated with a respective telephone user and with either of a first telephone exchange or a second telephone exchange, said first telephone exchange having first telephone stations, said first telephone exchange and said second telephone exchange connected by a private network or a public switched telephone network; and
   a first location and routing unit coupled to said first telephone exchange, said location and routing unit to locate a particular personal unit associated with said second telephone exchange based on a signal produced by said particular personal unit when said particular personal unit is located at said first predefined coverage area, said first locating and routing unit to notify said particular personal unit of an incoming call intended for its respective telephone user and to automatically route said incoming call to a desired first telephone station being in proximity to said particular personal unit once said telephone user off-hooks said desired first telephone station.

10. The system of claim 9, further comprising:
    a second location and routing unit coupled to said second telephone exchange, said second telephone exchange having second telephone stations, said second location and routing unit to locate a specific personal unit associated with said first telephone exchange based on a signal produced by said specific personal unit, when said specific personal unit is located at a second predefined coverage area, said second location and routing unit to notify said specific personal unit of an incoming call intended for its respective telephone user and to automatically route said incoming call to a desired second telephone station being in proximity to said specific personal unit once said telephone user off-hooks said desired second telephone station.

* * * * *